(12) United States Patent
Panje

(10) Patent No.: US 10,681,407 B2
(45) Date of Patent: Jun. 9, 2020

(54) MANAGING TUNER CONFLICTS FOR GUIDE PRESENTATION

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/801,685

(22) Filed: Nov. 2, 2017

(65) Prior Publication Data

US 2019/0132634 A1    May 2, 2019

(51) Int. Cl.
*H04N 21/426* (2011.01)
*H04N 21/458* (2011.01)
*H04N 21/431* (2011.01)

(52) U.S. Cl.
CPC ..... *H04N 21/4263* (2013.01); *H04N 21/4312* (2013.01); *H04N 21/4583* (2013.01)

(58) Field of Classification Search
CPC ............. H04N 21/4263; H04N 21/4583
See application file for complete search history.

(56) References Cited

U.S. PATENT DOCUMENTS

| | | | |
|---|---|---|---|
| 5,844,620 A * | 12/1998 | Coleman | H04N 7/16 725/54 |
| 2002/0174430 A1* | 11/2002 | Ellis | G11B 27/005 725/46 |
| 2008/0086746 A1* | 4/2008 | King | H04N 5/44543 725/43 |
| 2013/0212624 A1 | 8/2013 | Okada | |
| 2014/0059615 A1 | 2/2014 | Sirpal et al. | |
| 2014/0325566 A1 | 10/2014 | Roberts et al. | |

\* cited by examiner

*Primary Examiner* — Yassin Alata
(74) *Attorney, Agent, or Firm* — Bart A. Perkins

(57) ABSTRACT

Methods, systems, and computer readable media can be operable to facilitate tuner conflict management in response to a request for guide media. When a request for presentation of a guide is received at a multimedia device, the multimedia device may determine the status of a foreground tuner and one or more background tuners available to the multimedia device. If all background tuners are busy recording, the multimedia device may tune a foreground tuner to the guide channel and present the guide media to a user. If the foreground tuner and all background tuners are busy recording, the multimedia device may generate and output for presentation, a display that includes media from the foreground tuner and media from one or more background tuners. The multimedia device may provide a user with an option to terminate a current recording to free up a tuner for tuning to the guide channel.

20 Claims, 8 Drawing Sheets

MANAGING TUNER CONFLICTS FOR GUIDE PRESENTATION

TECHNICAL FIELD

This disclosure relates to the management of tuner conflicts for guide presentation.

BACKGROUND

The delivery of cloud-based guide and/or user interfaces to CPE (customer premise equipment) devices such as set-top boxes (STB) as a transport stream is gaining popularity as it enables an MSO (multiple systems operator) to flexibly modify/update the look and feel of a guide/user interface without requiring software upgrades and/or browser updates. A cloud-based user interface may be delivered in the format of an MPEG-2 transport stream.

As a user browses or otherwise interacts with a guide (e.g., by pressing user remote keys), the CPE application may take those keys and send the action codes to the cloud server. Based on the guide context and the key codes received, the cloud server may construct a transport stream containing the video image to be rendered on the CPE device. The guide transport stream is typically presented to a user such that a user interface has a window on the top left side where the currently watched channel is scaled and presented, and the guide media is presented within the remaining portion of the screen. Generally, the CPE device composites both videos to provide a picture-in-picture (PIP) effect (with the live video scaled and presented on one corner and guide video composited on top of the live video).

However, retrieving and presenting the guide media that is received at a CPE device within a transport stream generally requires utilization of a tuner, and CPE device tuners are typically scarce resources. For example, one or more background tuners may be used by a CPE device to record one or more programs while a foreground tuner is used to present and/or record a program. When all tuners of the CPE device are busy (i.e., recording, presenting, etc.), then the CPE device may be unable to tune to a channel carrying guide media, thus the CPE device may be unable to present the guide media.

Therefore, it is desirable to improve upon methods and systems for managing tuner conflicts created by a request for guide media.

BRIEF DESCRIPTION OF THE DRAWINGS

Like reference numbers and designations in the various drawings indicate like elements.

DETAILED DESCRIPTION

It is desirable to improve upon methods and systems for managing tuner conflicts created by a request for guide media. Methods, systems, and computer readable media can be operable to facilitate tuner conflict management in response to a request for guide media. When a request for presentation of a guide is received at a multimedia device, the multimedia device may determine the status of a foreground tuner and one or more background tuners available to the multimedia device. If all background tuners are busy recording, the multimedia device may tune a foreground tuner to the guide channel and present the guide media to a user. If the foreground tuner and all background tuners are busy recording, the multimedia device may generate and output for presentation, a display that includes media from the foreground tuner and media from one or more background tuners. The multimedia device may provide a user with an option to terminate a current recording to free up a tuner for tuning to the guide channel.

Figure 1:
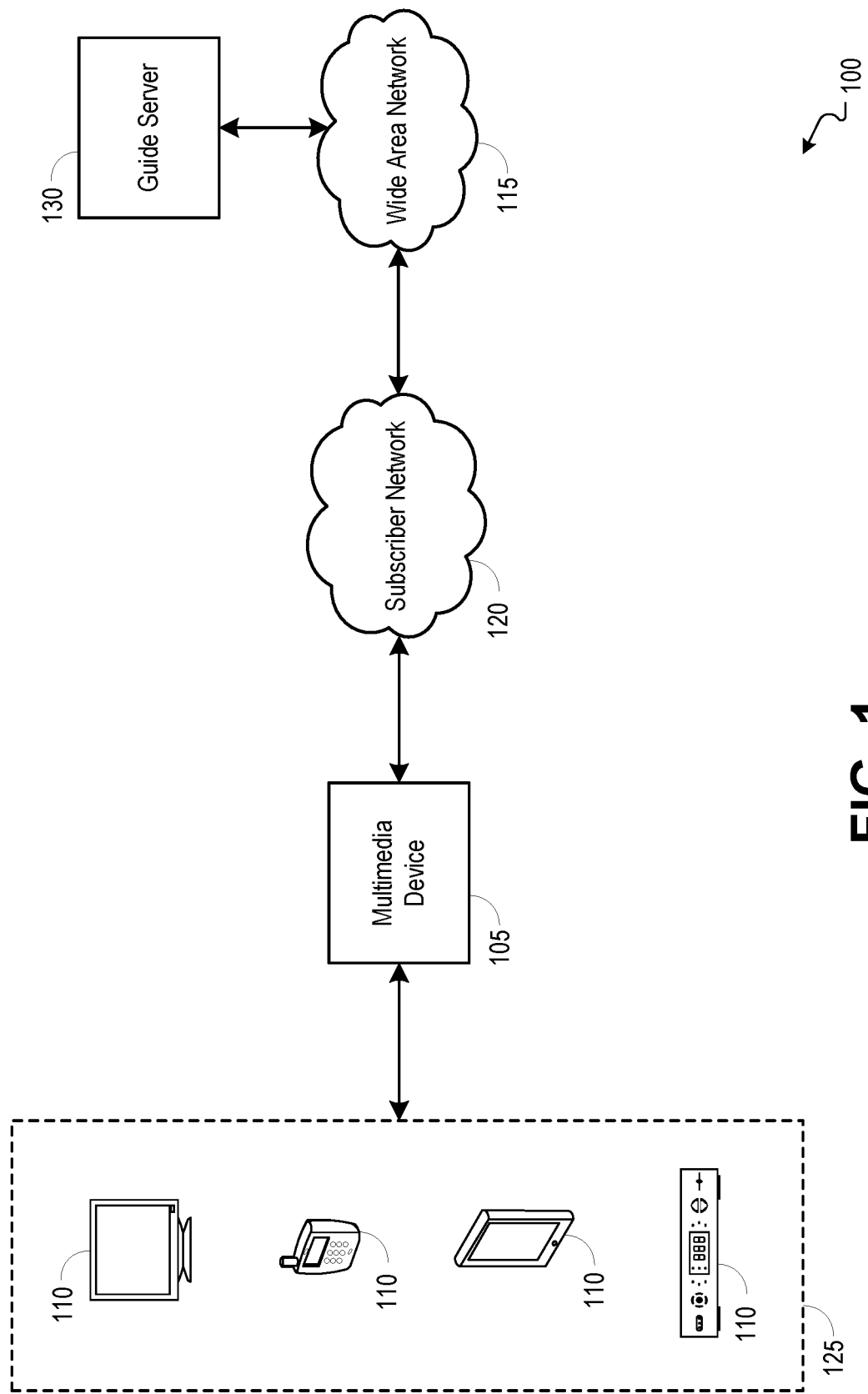
FIG. 1 is a block diagram illustrating an example network environment operable to facilitate tuner conflict management in response to a request for guide media.

FIG. 1 is a block diagram illustrating an example network environment 100 operable to facilitate tuner conflict management in response to a request for guide media. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated premise. While the components shown in FIG. 1 are shown separate from each other, it should be understood that the various components can be integrated into each other.

In embodiments, an interactive guide may be presented to a user through a display (e.g., client device 110) that is connected to a multimedia device 105. Through an interface associated with the multimedia device 105 (e.g., key codes received from a control device such as a remote control unit (RCU)), a user may navigate the interactive guide to view program scheduling of one or more channels, to select programs for recording, or to view information associated with a program. For example, the interactive guide may be generated from electronic program guide (EPG) data. The interactive guide may be generated, maintained, and output to a multimedia device by a guide server 130. For example, in response to user initiated actions taken with respect to an interactive guide, the guide server 130 may generate a media stream that includes video and/or audio associated with the user initiated actions. The guide server 130 may add the media stream to a transport stream and may output the transport stream to a multimedia device 105.

In embodiments, a multimedia device 105 may utilize a free or available tuner to tune to and present media received through a guide channel. A multimedia device 105 may include a plurality of tuners. A foreground tuner of the multimedia device 105 may be a tuner that is tuned to a channel from which retrieved media is being presented at a display. One or more background tuners of the multimedia device 105 may be tuners of the device that are not currently being used to retrieve media that is being presented. The one or more background tuners may be free or available, or the one or more background tuners may be tuned to a channel from which retrieved media is being recorded. When presentation of a guide is requested at the multimedia device 105, a free or available tuner may be utilized to tune to the guide channel, and the media retrieved from the guide channel may be presented at a display along with media retrieved from a channel to which a foreground tuner is tuned. For example, the media associated with a channel currently being viewed/presented may be displayed within a window (e.g., picture-in-picture window) that is overlaying a presentation of the guide channel media.

In embodiments, when presentation of a guide is requested and there are no free or available tuners at the multimedia device 105, the multimedia device 105 may compare a priority level associated with the guide channel to a priority level associated with each program being presented/recorded through each tuner of the multimedia device 105. For example, a priority level associated with a guide channel and priority levels associated with individual recordings (e.g., priority based on preferred program, channel, genre, etc.) may be configured at a multimedia device 105 based upon default settings or based upon user-input. If the priority level associated with the guide channel is higher than a priority level associated with a recording, the recording associated with the lower priority level may be terminated, and the tuner through which the recording was being made may be tuned to the guide channel.

In embodiments, when presentation of a guide is requested, the foreground tuner is presenting but not recording, and each of the background tuners of the multimedia device 105 are being utilized for recordings having a higher priority level than the priority level associated with the guide channel, the multimedia device 105 may keep the background tuners tuned to their respective channels from which recordings are being produced, and the multimedia device 105 may tune a foreground tuner away from a current channel to the guide channel. With the foreground tuner tuned to the guide channel, media associated with the guide channel may be retrieved and presented at a display. In this instance, as the foreground tuner is tuned to the guide channel, only the media received through the guide channel is presented at the display. The multimedia device 105 may present the media associated with the guide channel without any overlaying of a picture-in-picture (PIP) window that may be used to display other media that is being presented/recorded by the multimedia device 105.

A user may interact with the displayed guide by browsing the guide to find a program of interest. When a user identifies a program of interest within the guide, the user may select the program of interest, and the foreground tuner that is currently tuned to the guide channel may be tuned away from the guide channel and to a channel carrying the selected program. Once the selected channel is tuned to, media associated with the selected channel may be presented at the display in place of media associated with the guide channel. Upon any subsequent tuning requests being received by the multimedia device 105, only the foreground tuner is used until a background tuner is relieved of high priority program recording.

In embodiments, when presentation of a guide is requested, the foreground tuner is presenting but not recording, and each of the background tuners of the multimedia device 105 are being utilized for recordings having a higher priority level than the priority level associated with the guide channel, the multimedia device 105 may keep the background tuners tuned to their respective channels from which recordings are being produced, and the multimedia device 105 may tune a foreground tuner away from a current channel to the guide channel. With the foreground tuner tuned to the guide channel, media associated with the guide channel may be retrieved and presented at a display. The multimedia device 105 may also output for presentation, a secondary display that includes a display of media retrieved through a background tuner that is currently being utilized for recording. For example, the secondary display may be presented within a scaled window (e.g., PIP window), over the top of the display of the guide channel media. The appearance of the scaled window within which the secondary display is presented may be given a distinguishing feature to indicate that the displayed media is associated with content that is being recorded on a background tuner. For example, a border surrounding the secondary display may be highlighted or colored to indicate that the media shown within the display is associated with a program being recorded through a background tuner.

A user may interact with the displayed guide by browsing the guide to find a program of interest. When a user identifies a program of interest within the guide, the user may select the program of interest, and the foreground tuner that is currently tuned to the guide channel may be tuned away from the guide channel and to a channel carrying the selected program. Once the selected channel is tuned to, media associated with the selected channel may be presented at the display in place of media associated with the guide channel. Upon any subsequent tuning requests being received by the multimedia device 105, only the foreground tuner is used until a background tuner is relieved of high priority program recording.

In embodiments, a user may decide to terminate the recording of the program associated with the media shown within the secondary display. For example, the multimedia device 105 may prompt a user to decide between maintaining the recording being carried out by the background tuner or terminating the recording and displaying a currently presented program within the secondary display. In response to a user request to terminate a recording being carried out by a background tuner of the multimedia device 105, the multimedia device 105 may terminate the recording, thus freeing up the background tuner, and the background tuner may be utilized to carry out subsequent tuning requests. For example, when the recording is terminated, the multimedia device 105 may tune a free tuner (i.e., either the background tuner through which the terminated recording had been received or the foreground tuner) to a currently presented channel (e.g., a channel that was tuned to prior to the tuning of the foreground tuner to the guide channel), and media received over the currently presented channel may be shown within the secondary display.

In embodiments, when presentation of a guide is requested, there are no free or available tuners at the multimedia device 105 (e.g., a foreground tuner and all background tuners are being used to record received media), and there are no current recordings with a lower priority level than a priority level associated with the guide channel, the multimedia device 105 may keep the background tuners and foreground tuner tuned to their respective channels from which recordings are being produced, and the multimedia device 105 may generate and present a display that includes media received over a channel tuned to by a foreground tuner and media received over one or more channels tuned to by one or more background tuners. For example, when presentation of a guide is requested, the multimedia device 105 may present media received over a channel that is tuned to by the foreground tuner (e.g., a currently presented channel) and a secondary display that includes a display of media retrieved through a background tuner that is currently being utilized for recording. For example, the secondary display may be presented within a scaled window (e.g., PIP window), over the top of the display of the media received over the channel to which the foreground tuner is tuned.

With no tuner available to be tuned to the guide channel, the user may choose a recording to be terminated in order to free up a tuner for retrieving the guide channel. In embodiments, the multimedia device 105 may prompt a user to select a recording to be terminated (e.g., the user may select one or more of the displayed recordings) or to choose an option to maintain all recordings and to forego a presentation of the guide channel.

Figure 2:
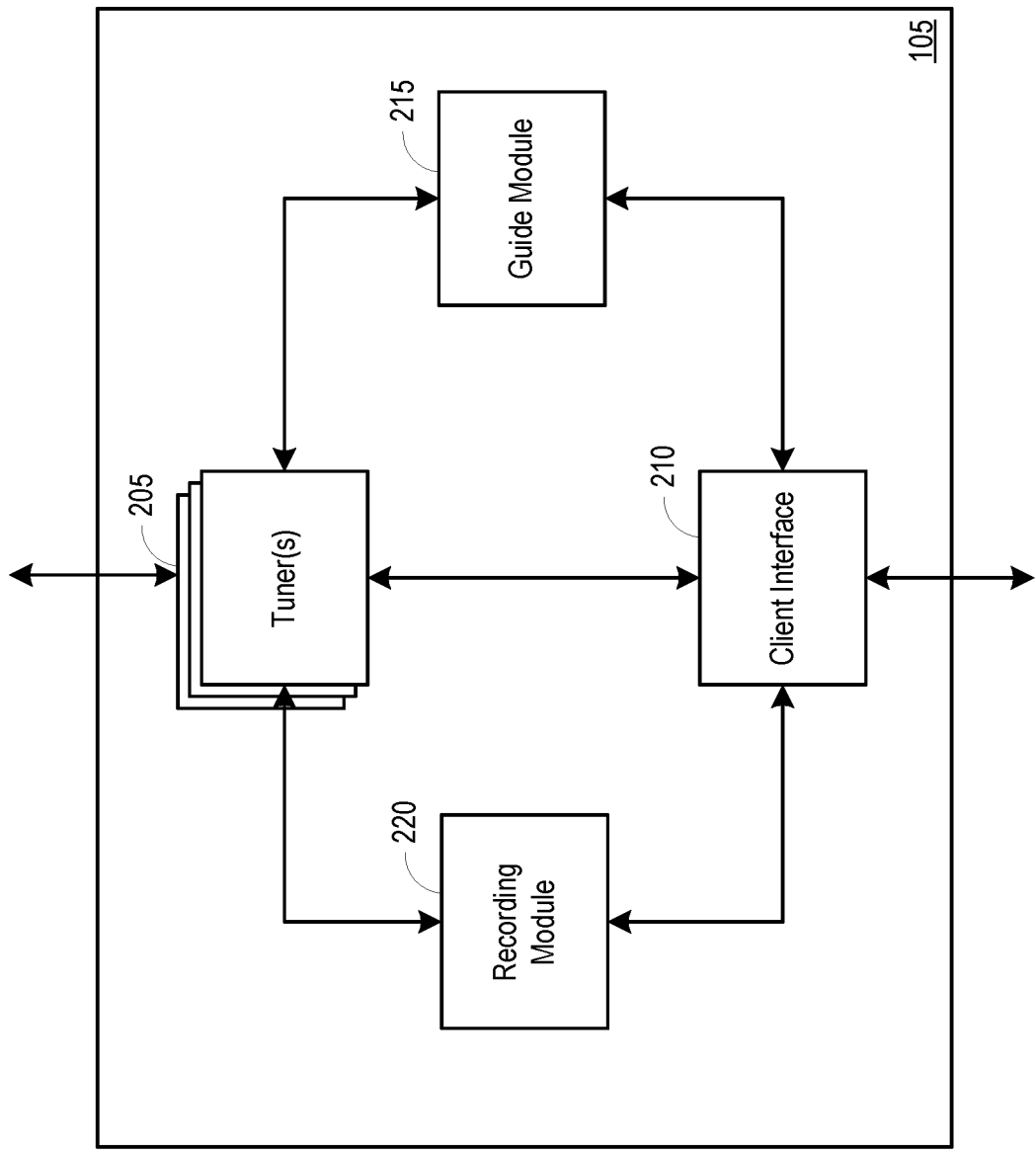
FIG. 2 is a block diagram illustrating an example multimedia device operable to facilitate tuner conflict management in response to a request for guide media.

FIG. 2 is a block diagram illustrating an example multimedia device 105 operable to facilitate tuner conflict management in response to a request for guide media. The multimedia device 105 may include one or more tuners 205, a client interface 210, a guide module 215, and a recording module 220. It should be understood that the multimedia device 105 may include a multimedia gateway or STB configured to provide video services to one or more display devices or client devices 110 of FIG. 1.

In embodiments, each of the one or more tuners 205 may be tuned to a channel to receive content carried over the channel. For example, each tuner 205 may be tuned to a frequency that is associated with a certain channel, and the frequency to which each tuner 205 is tuned may be controlled by requests received from user input to the multimedia device 105 or requests received from one or more client devices 110 of FIG. 1 through the client interface 210.

In embodiments, an interactive guide may be presented to a user through a display (e.g., client device 110) that is connected to a multimedia device 105. Through communications delivered to the multimedia device 105 via the client interface 210 (e.g., key codes received from a control device such as a remote control unit (RCU)), a user may navigate the interactive guide to view program scheduling of one or more channels, to select programs for recording, or to view information associated with a program. For example, the interactive guide may be generated from electronic program guide (EPG) data. The interactive guide may be generated, maintained, and output to a multimedia device by an upstream server (e.g., guide server 130 of FIG. 1). For example, in response to user initiated actions taken with respect to an interactive guide, the guide server 130 may generate a media stream that includes video and/or audio associated with the user initiated actions. The guide server 130 may add the media stream to a transport stream and may output the transport stream to the multimedia device 105. When presentation of a guide is requested, a tuner 205 may be tuned to a guide channel, and guide media carried over the guide channel may be retrieved and output for presentation at a display by the guide module 215. As an example, the media associated with a channel currently being viewed/presented (e.g., channel to which a foreground tuner is tuned) may be displayed within a window (e.g., picture-in-picture window) that is overlaying a presentation of the guide channel media.

In embodiments, when presentation of a guide is requested, the guide module 215 may determine whether at least one of the tuners 205 is available. If there are no free or available tuners 205 at the multimedia device 105, the guide module 215 may compare a priority level associated with the guide channel to a priority level associated with each program being presented/recorded through each tuner 205. For example, a priority level associated with a guide channel and priority levels associated with individual recordings (e.g., priority based on preferred program, channel, genre, etc.) may be configured at a multimedia device 105 based upon default settings or based upon user-input. If the priority level associated with the guide channel is higher than a priority level associated with a recording, the recording associated with the lower priority level may be terminated, and the tuner 205 through which the recording was being made may be tuned to the guide channel.

In embodiments, when presentation of a guide is requested, a foreground tuner 205 is presenting but not recording, and each of the background tuners 205 are being utilized for recordings having a higher priority level than the priority level associated with the guide channel, the multimedia device 105 may keep the background tuners tuned to their respective channels from which recordings are being produced, and a foreground tuner 205 may be tuned away from a current channel to the guide channel. With the foreground tuner 205 tuned to the guide channel, the guide module 215 may retrieve media associated with the guide channel and output the media through the client interface 210 for presentation at a display. In this instance, as the foreground tuner 205 is tuned to the guide channel, only the media received through the guide channel is presented at the display. The guide module 215 may generate an interface that includes a presentation of media associated with the guide channel without any overlaying of a picture-in-picture (PIP) window that may be used to display other media that is being presented/recorded by the multimedia device 105.

In embodiments, when presentation of a guide is requested, a foreground tuner 205 is presenting but not recording, and each of the background tuners 205 are being utilized for recordings having a higher priority level than the priority level associated with the guide channel, the multimedia device 105 may keep the background tuners tuned to their respective channels from which recordings are being produced, and the guide module 215 may tune a foreground tuner 205 away from a current channel to the guide channel. With the foreground tuner 205 tuned to the guide channel, the guide module 215 may retrieve media associated with the guide channel and output the media through the client interface for presentation at a display. The guide module 215 may also output for presentation, a secondary display that includes a display of media retrieved through a background tuner 205 that is currently being utilized for recording. For example, the secondary display may be presented within a scaled window (e.g., PIP window), over the top of the display of the guide channel media.

In embodiments, the guide module 215 may prompt a user to decide between maintaining the recording being carried out by the background tuner 205 or terminating the recording and displaying a currently presented program within the secondary display. In response to a user request to terminate a recording being carried out by a background tuner 205, the guide module 215 may terminate the recording, thus freeing up the background tuner 205, and the background tuner 205 may be utilized to carry out subsequent tuning requests. For example, when the recording is terminated, the multimedia device 105 may tune a free tuner 205 (i.e., either the background tuner 205 through which the terminated recording had been received or the foreground tuner 205) to a currently presented channel (e.g., a channel tuned to prior to the tuning of the foreground tuner 205 to the guide channel), and media received over the currently presented channel may be shown within the secondary display.

In embodiments, when presentation of a guide is requested, there are no free or available tuners 205 at the multimedia device 105 (e.g., a foreground tuner 205 and all background tuners 205 are being used to record received media), and there are no current recordings with a lower priority level than a priority level associated with the guide channel, the multimedia device 105 may keep the background tuners 205 and foreground tuner 205 tuned to their respective channels from which recordings are being produced, and the guide module 215 may generate and present a display that includes media received over a channel tuned to by a foreground tuner 205 and media received over one or more channels tuned to by one or more background tuners 205. For example, when presentation of a guide is requested, the guide module 215 may generate and present an interface that includes media received over a channel that is tuned to by the foreground tuner 205 (e.g., a currently presented channel) and a secondary display that includes a display of media retrieved through a background tuner 205 that is currently being utilized for recording. For example, the secondary display may be presented within a scaled window (e.g., PIP window), over the top of the display of the media received over the channel to which the foreground tuner 205 is tuned.

In embodiments, the guide module 215 may prompt a user to select a recording to be terminated (e.g., the user may select one or more of the displayed recordings) or to choose an option to maintain all recordings and to forego a presentation of the guide channel.

Figure 3:
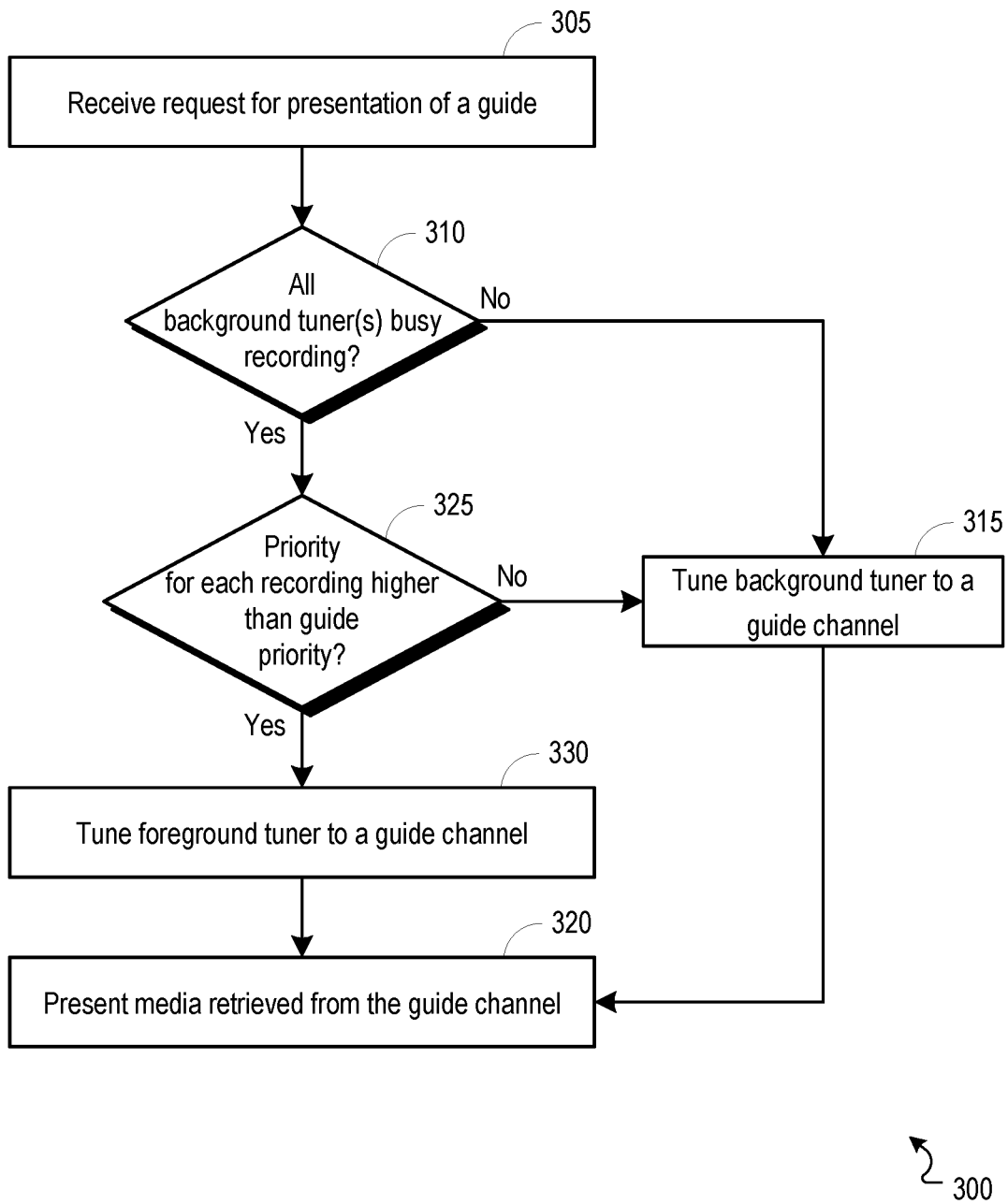
FIG. 3 is a flowchart illustrating an example process operable to facilitate the presentation of guide media by tuning a foreground tuner to a guide channel when background tuner(s) are busy.

FIG. 3 is a flowchart illustrating an example process 300 operable to facilitate the presentation of guide media by tuning a foreground tuner to a guide channel when background tuner(s) are busy. The process 300 may be carried out, for example, by a multimedia device 105 of FIG. 1. The process 300 can begin at 305, when a request for presentation of a guide is received. In embodiments, the request for presentation of a guide may be received at a multimedia device 105 and may be recognized by a guide module 215 of FIG. 2.

At 310, a determination may be made whether each of one or more background tuners available to the multimedia device 105 are currently busy carrying out a recording operation. The determination whether all background tuners are busy recording may be made, for example, by a guide module 215. In embodiments, the guide module 215 may determine a current tuning status (i.e., whether a tuner is tuned to a channel) and a current recording status (i.e., whether media received over a channel to which a tuner is tuned is being recorded) for each background tuner (e.g., tuner 205 of FIG. 2) available to the multimedia device 105. If the determination is made that at least one background tuner is not currently being utilized to record media retrieved over a channel, the free background tuner may be tuned to a guide channel at 315, and media retrieved over the guide channel may be presented (e.g., the media may be output to a display such as a client device 110 of FIG. 1) at 320.

If, at 310, the determination is made that each of one or more background tuners available to the multimedia device 105 is busy carrying out a recording operation, the process 300 may proceed to 325. At 325, a determination may be made whether a priority level associated with each of one or more recordings being carried out by the one or more background tuners is higher than a priority level associated with the guide channel. The determination whether a priority level associated with each of the one or more recordings is higher than the priority level associated with the guide channel may be made, for example, by the guide module 215. In embodiments, the guide module 215 may compare a priority level associated with the guide channel to a priority level associated with each program being presented/recorded through each background tuner. For example, a priority level associated with a guide channel and priority levels associated with individual recordings (e.g., priority based on preferred program, channel, genre, etc.) may be configured at the multimedia device 105 based upon default settings or based upon user-input. If the determination is made that at least one recording being carried out by a background tuner has a lower priority level than the priority level associated with the guide channel, the recording associated with the lower priority level may be terminated and the background tuner being utilized to carry out the recording may be tuned to a guide channel at 315. Media retrieved over the guide channel may be presented (e.g., the media may be output to a display such as a client device 110 of FIG. 1) at 320.

If, at 325, the determination is made that the priority level associated with each recording being carried out by the background tuner(s) of the multimedia device 105 is higher than the priority level associated with the guide channel, the process 300 may proceed to 330. At 330, a foreground tuner of the multimedia device 105 may be tuned to the guide channel. In embodiments, the foreground tuner may be a tuner that is currently being used to present media from a channel to a viewer. The foreground tuner may be tuned away from a channel currently being presented and may be tuned to the guide channel. With the foreground tuner tuned to the guide channel, the guide module 215 may retrieve media associated with the guide channel and output the media for presentation at a display at 320. In embodiments, only the media received through the guide channel is presented at the display. The guide module 215 may generate an interface that includes a presentation of media associated with the guide channel without any overlaying of a picturein-picture (PIP) window that may be used to display other media that is being presented/recorded by the multimedia device 105.

Figure 4:
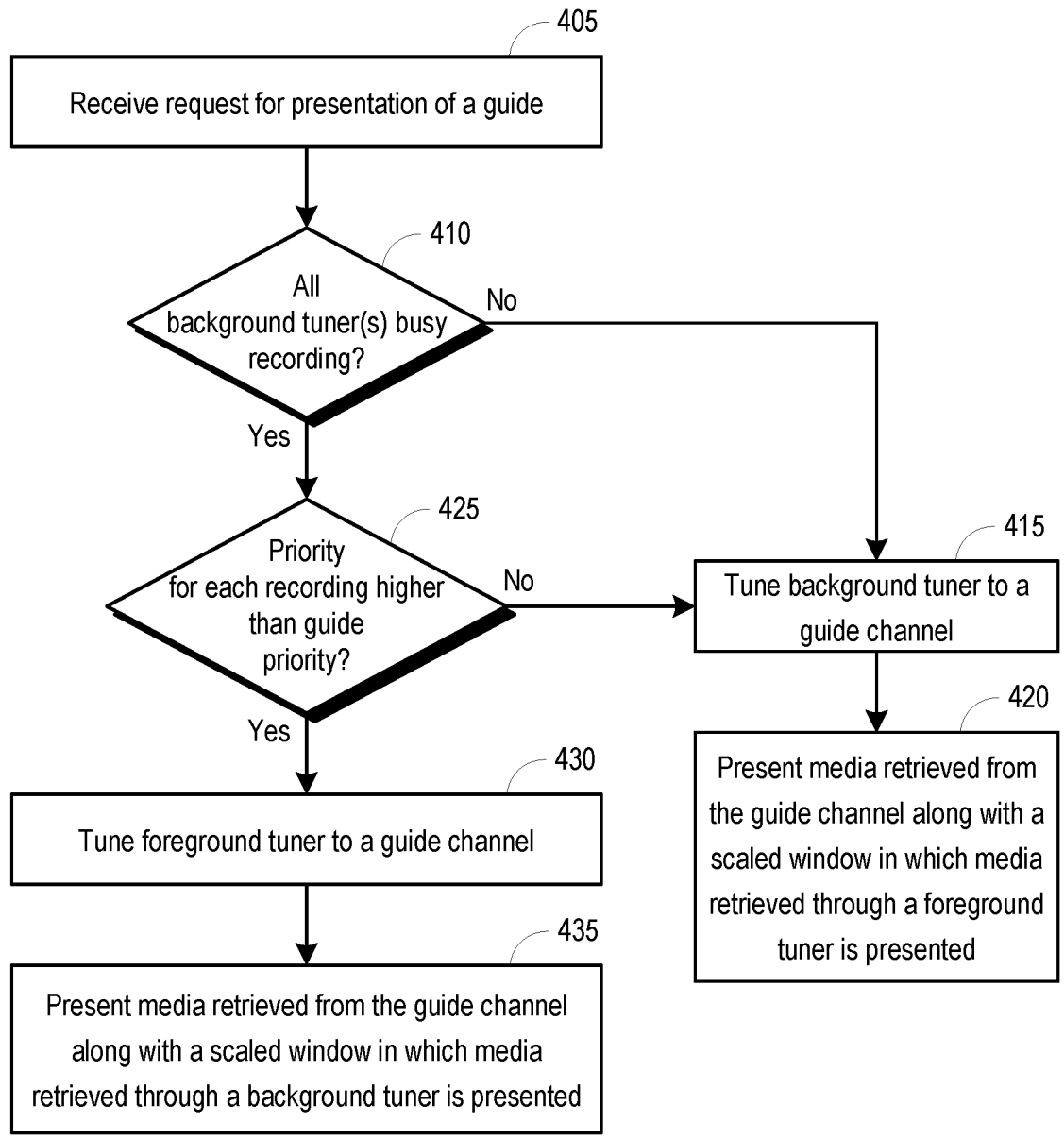
FIG. 4 is a flowchart illustrating an example process operable to facilitate the presentation of guide media and media retrieved through a background tuner by tuning a foreground tuner to a guide channel when background tuner(s) are busy.

FIG. 4 is a flowchart illustrating an example process 400 operable to facilitate the presentation of guide media and media retrieved through a background tuner by tuning a foreground tuner to a guide channel when background tuner(s) are busy. The process 400 may be carried out, for example, by a multimedia device 105 of FIG. 1. The process 400 can begin at 405, when a request for presentation of a guide is received. In embodiments, the request for presentation of a guide may be received at a multimedia device 105 and may be recognized by a guide module 215 of FIG. 2.

At 410, a determination may be made whether each of one or more background tuners available to the multimedia device 105 are currently busy carrying out a recording operation. The determination whether all background tuners are busy recording may be made, for example, by a guide module 215. In embodiments, the guide module 215 may determine a current tuning status (i.e., whether a tuner is tuned to a channel) and a current recording status (i.e., whether media received over a channel to which a tuner is tuned is being recorded) for each background tuner (e.g., tuner 205 of FIG. 2) available to the multimedia device 105. If the determination is made that at least one background tuner is not currently being utilized to record media retrieved over a channel, the free background tuner may be tuned to a guide channel at 415, and media retrieved over the guide channel may be presented (e.g., the media may be output to a display such as a client device 110 of FIG. 1) at 420. For example, the guide module 215 may generate a display/interface that includes a primary display that includes a display of media retrieved over the guide channel along with a secondary display that includes a display of media retrieved through a foreground tuner (e.g., tuner 205) that is currently being utilized for presenting/recording. The secondary display may be presented within a scaled window (e.g., PIP window), over the top of the display of the guide channel media.

If, at 410, the determination is made that each of one or more background tuners available to the multimedia device 105 is busy carrying out a recording operation, the process 400 may proceed to 425. At 425, a determination may be made whether a priority level associated with each of one or more recordings being carried out by the one or more background tuners is higher than a priority level associated with the guide channel. The determination whether a priority level associated with each of the one or more recordings is higher than the priority level associated with the guide channel may be made, for example, by the guide module 215. In embodiments, the guide module 215 may compare a priority level associated with the guide channel to a priority level associated with each program being presented/recorded through each background tuner. For example, a priority level associated with a guide channel and priority levels associated with individual recordings (e.g., priority based on preferred program, channel, genre, etc.) may be configured at the multimedia device 105 based upon default settings or based upon user-input. If the determination is made that at least one recording being carried out by a background tuner has a lower priority level than the priority level associated with the guide channel, the recording associated with the lower priority level may be terminated and the background tuner being utilized to carry out the recording may be tuned to a guide channel at 415. Media retrieved over the guide channel may be presented (e.g., the media may be output to a display such as a client device 110 of FIG. 1) at 420. For example, the guide module 215 may generate a display/interface that includes a primary display that includes a display of media retrieved over the guide channel along with a secondary display that includes a display of media retrieved through a foreground tuner (e.g., tuner 205) that is currently being utilized for presenting/recording. The secondary display may be presented within a scaled window (e.g., PIP window), over the top of the display of the guide channel media.

If, at 425, the determination is made that the priority level associated with each recording being carried out by the background tuner(s) of the multimedia device 105 is higher than the priority level associated with the guide channel, the process 400 may proceed to 430. At 430, a foreground tuner of the multimedia device 105 may be tuned to the guide channel. In embodiments, the foreground tuner may be a tuner that is currently being used to present media from a channel to a viewer. The foreground tuner may be tuned away from a channel currently being presented and may be tuned to the guide channel. With the foreground tuner tuned to the guide channel, the guide module 215 may retrieve media associated with the guide channel.

At 435, media retrieved from the guide channel may be presented along with a scaled window in which media retrieved through a background tuner is presented. For example, the guide module 215 may generate a display/interface that includes a primary display that includes a display of media retrieved over the guide channel (e.g., guide media retrieved through the foreground tuner) along with a secondary display that includes a display of media retrieved through a background tuner (e.g., tuner 205) that is currently being utilized for recording. The secondary display may be presented within a scaled window (e.g., PIP window), over the top of the display of the guide channel media.

Figure 5:
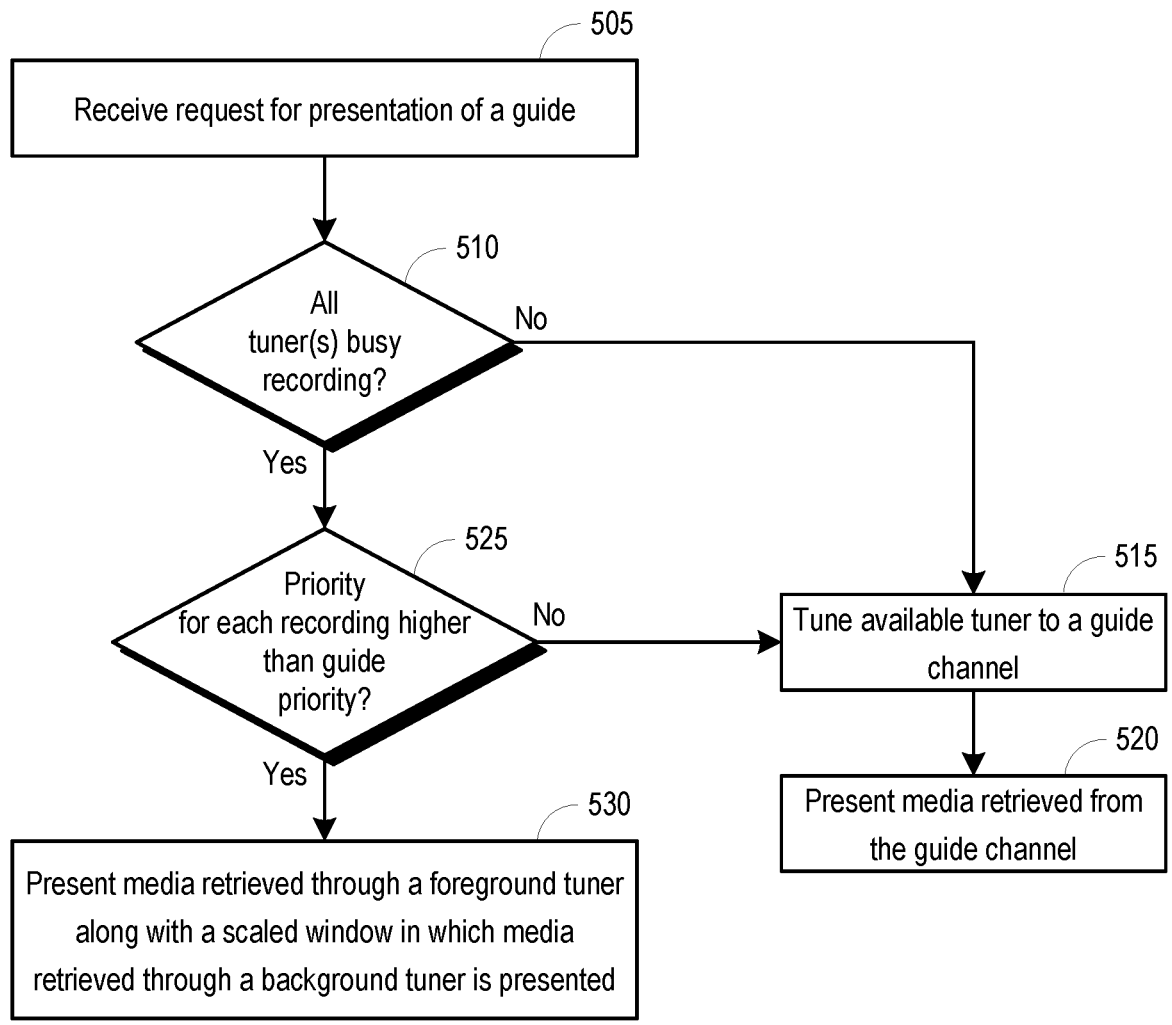
FIG. 5 is a flowchart illustrating an example process operable to facilitate the presentation of media retrieved through a foreground tuner and media retrieved through a background tuner in response to receiving a guide request when all tuners are busy.

FIG. 5 is a flowchart illustrating an example process 500 operable to facilitate the presentation of media retrieved through a foreground tuner and media retrieved through a background tuner in response to receiving a guide request when all tuners are busy. The process 500 may be carried out, for example, by a multimedia device 105 of FIG. 1. The process 500 can begin at 505, when a request for presentation of a guide is received. In embodiments, the request for presentation of a guide may be received at a multimedia device 105 and may be recognized by a guide module 215 of FIG. 2.

At 510, a determination may be made whether all tuners available to the multimedia device 105 are currently busy carrying out a recording operation. The determination whether all tuners (e.g., foreground and background tuners) are busy recording may be made, for example, by a guide module 215. In embodiments, the guide module 215 may determine a current tuning status (i.e., whether a tuner is tuned to a channel) and a current recording status (i.e., whether media received over a channel to which a tuner is tuned is being recorded) for each tuner (e.g., tuner 205 of FIG. 2) available to the multimedia device 105. If the determination is made that at least one tuner is not currently being utilized to record media retrieved over a channel, an available tuner (e.g., either a foreground or background tuner that is not carrying out a recording operation) may be tuned to a guide channel at 515, and media retrieved over the guide channel may be presented (e.g., the media may be output to a display such as a client device 110 of FIG. 1) at 520. For example, the guide module 215 may generate a display/interface that includes a primary display that includes a display of media retrieved over the guide channel, and the display/interface may include one or more secondary displays that include a display of media retrieved through one or more other tuners.

If, at 510, the determination is made that each of one or more tuners available to the multimedia device 105 is busy carrying out a recording operation, the process 500 may proceed to 525. At 525, a determination may be made whether a priority level associated with each of one or more recordings being carried out by the one or more tuners is higher than a priority level associated with the guide channel. The determination whether a priority level associated with each of the one or more recordings is higher than the priority level associated with the guide channel may be made, for example, by the guide module 215. In embodiments, the guide module 215 may compare a priority level associated with the guide channel to a priority level associated with each program being presented/recorded through each tuner. For example, a priority level associated with a guide channel and priority levels associated with individual recordings (e.g., priority based on preferred program, channel, genre, etc.) may be configured at the multimedia device 105 based upon default settings or based upon user-input. If the determination is made that at least one recording being carried out by a tuner has a lower priority level than the priority level associated with the guide channel, the recording associated with the lower priority level may be terminated and the tuner being utilized to carry out the recording may be tuned to a guide channel at 515. Media retrieved over the guide channel may be presented (e.g., the media may be output to a display such as a client device 110 of FIG. 1) at 520. For example, the guide module 215 may generate a display/interface that includes a primary display that includes a display of media retrieved over the guide channel, and the display/interface may include one or more secondary displays that include a display of media retrieved through one or more other tuners.

If, at 525, the determination is made that the priority level associated with each recording being carried out by the tuner(s) of the multimedia device 105 is higher than the priority level associated with the guide channel, the process 500 may proceed to 530. At 530, media retrieved through a foreground tuner may be presented along with a scaled window in which media retrieved through a background tuner is presented. For example, the guide module 215 may generate a display/interface that includes a primary display that includes a display of media retrieved through the foreground tuner (e.g., a tuner 205 of FIG. 2) along with one or more secondary displays that include a display of media retrieved through one or more background tuners (e.g., tuner(s) 205) that are currently being utilized for recording. The secondary display(s) may be presented within a scaled window (e.g., PIP window), over the top of the display of the media retrieved through the foreground tuner.

Figure 6:
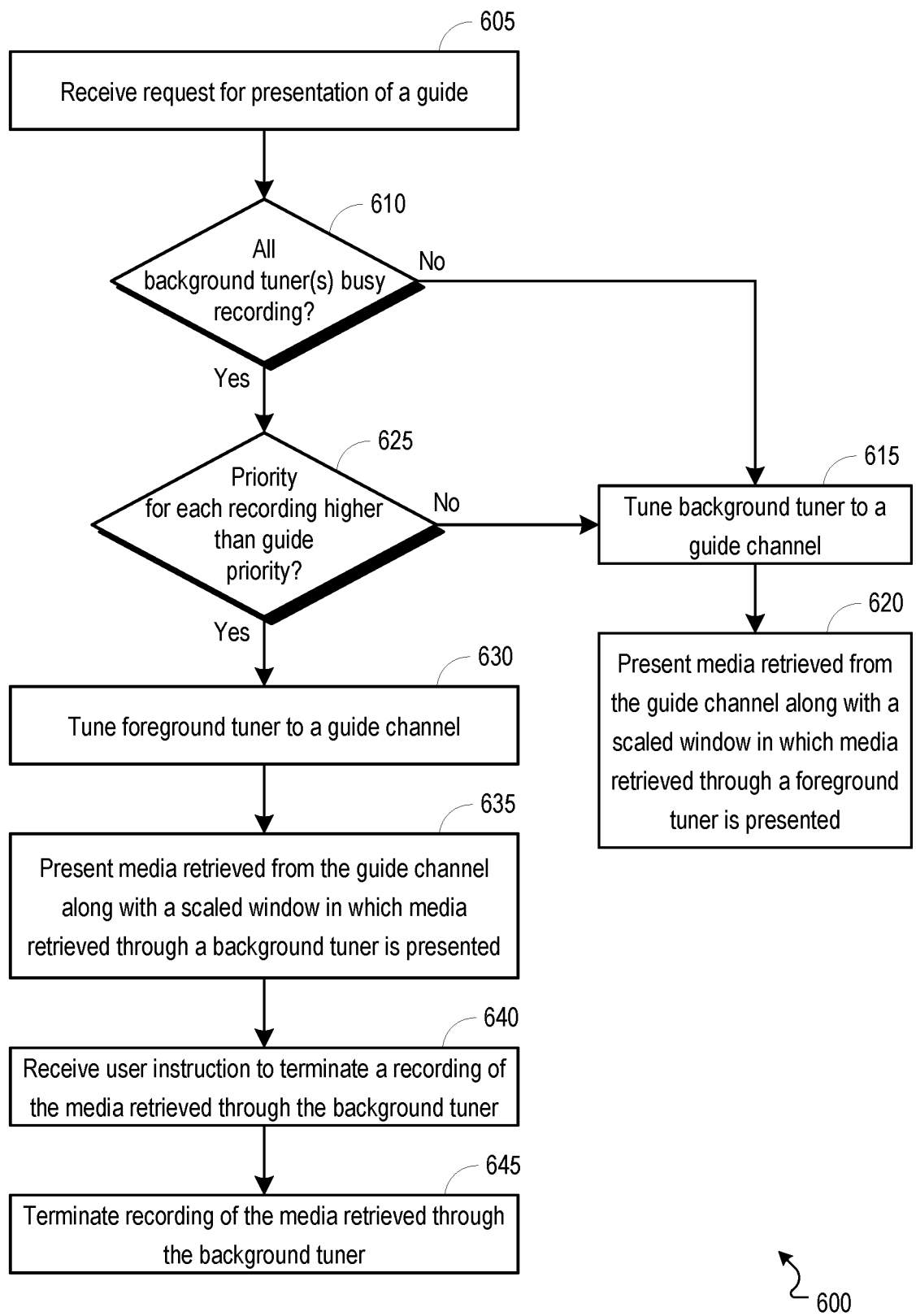
FIG. 6 is a flowchart illustrating an example process operable to facilitate the termination of a recording being carried out by a background tuner in response to a presentation of guide media along with the media retrieved through the background tuner.

FIG. 6 is a flowchart illustrating an example process 600 operable to facilitate the termination of a recording being carried out by a background tuner in response to a presentation of guide media along with the media retrieved through the background tuner. The process 600 may be carried out, for example, by a multimedia device 105 of FIG. 1. The process 600 can begin at 605, when a request for presentation of a guide is received. In embodiments, the request for presentation of a guide may be received at a multimedia device 105 and may be recognized by a guide module 215 of FIG. 2.

At 610, a determination may be made whether each of one or more background tuners available to the multimedia device 105 are currently busy carrying out a recording operation. The determination whether all background tuners are busy recording may be made, for example, by a guide module 215. In embodiments, the guide module 215 may determine a current tuning status (i.e., whether a tuner is tuned to a channel) and a current recording status (i.e., whether media received over a channel to which a tuner is tuned is being recorded) for each background tuner (e.g., tuner 205 of FIG. 2) available to the multimedia device 105. If the determination is made that at least one background tuner is not currently being utilized to record media retrieved over a channel, the free background tuner may be tuned to a guide channel at 615, and media retrieved over the guide channel may be presented (e.g., the media may be output to a display such as a client device 110 of FIG. 1) at 620. For example, the guide module 215 may generate a display/interface that includes a primary display that includes a display of media retrieved over the guide channel along with a secondary display that includes a display of media retrieved through a foreground tuner (e.g., tuner 205) that is currently being utilized for presenting/recording. The secondary display may be presented within a scaled window (e.g., PIP window), over the top of the display of the guide channel media.

If, at 610, the determination is made that each of one or more background tuners available to the multimedia device 105 is busy carrying out a recording operation, the process 600 may proceed to 625. At 625, a determination may be made whether a priority level associated with each of one or more recordings being carried out by the one or more background tuners is higher than a priority level associated with the guide channel. The determination whether a priority level associated with each of the one or more recordings is higher than the priority level associated with the guide channel may be made, for example, by the guide module 215. In embodiments, the guide module 215 may compare a priority level associated with the guide channel to a priority level associated with each program being presented/recorded through each background tuner. For example, a priority level associated with a guide channel and priority levels associated with individual recordings (e.g., priority based on preferred program, channel, genre, etc.) may be configured at the multimedia device 105 based upon default settings or based upon user-input. If the determination is made that at least one recording being carried out by a background tuner has a lower priority level than the priority level associated with the guide channel, the recording associated with the lower priority level may be terminated and the background tuner being utilized to carry out the recording may be tuned to a guide channel at 615. Media retrieved over the guide channel may be presented (e.g., the media may be output to a display such as a client device 110 of FIG. 1) at 620. For example, the guide module 215 may generate a display/interface that includes a primary display that includes a display of media retrieved over the guide channel along with a secondary display that includes a display of media retrieved through a foreground tuner (e.g., tuner 205) that is currently being utilized for presenting/recording. The secondary display may be presented within a scaled window (e.g., PIP window), over the top of the display of the guide channel media.

If, at 625, the determination is made that the priority level associated with each recording being carried out by the background tuner(s) of the multimedia device 105 is higher than the priority level associated with the guide channel, the process 600 may proceed to 630. At 630, a foreground tuner of the multimedia device 105 may be tuned to the guide channel. In embodiments, the foreground tuner may be a tuner that is currently being used to present media from a channel to a viewer. The foreground tuner may be tuned away from a channel currently being presented and may be tuned to the guide channel. With the foreground tuner tuned to the guide channel, the guide module 215 may retrieve media associated with the guide channel.

At 635, media retrieved from the guide channel may be presented along with a scaled window in which media retrieved through a background tuner is presented. For example, the guide module 215 may generate a display/interface that includes a primary display that includes a display of media retrieved over the guide channel (e.g., guide media retrieved through the foreground tuner) along with a secondary display that includes a display of media retrieved through a background tuner (e.g., tuner 205) that is currently being utilized for recording. The secondary display may be presented within a scaled window (e.g., PIP window), over the top of the display of the guide channel media.

At 640, a user instruction to terminate a recording of the media retrieved through the background tuner may be received. The user instruction may be received, for example, by the guide module 215. In embodiments, the guide module 215 may present a selectable option to terminate the recording of the media displayed within the secondary display, wherein the option to terminate is presented within the displayed interface that includes the primary and secondary displays. In response to receiving a user selection of the option to terminate the recording of the media displayed within the secondary display, the guide module 215 may terminate the recording being carried out through the corresponding background tuner at 645. After terminating the recording being carried out through the corresponding background tuner, the corresponding background tuner may be tuned to the guide channel and the foreground tuner may be tuned to a channel to which the foreground tuner was tuned to before being tuned to the guide channel at 630. The guide module 215 may continue to present the guide media within the primary display and content received through the foreground tuner may be presented within the secondary display.

Figure 7:
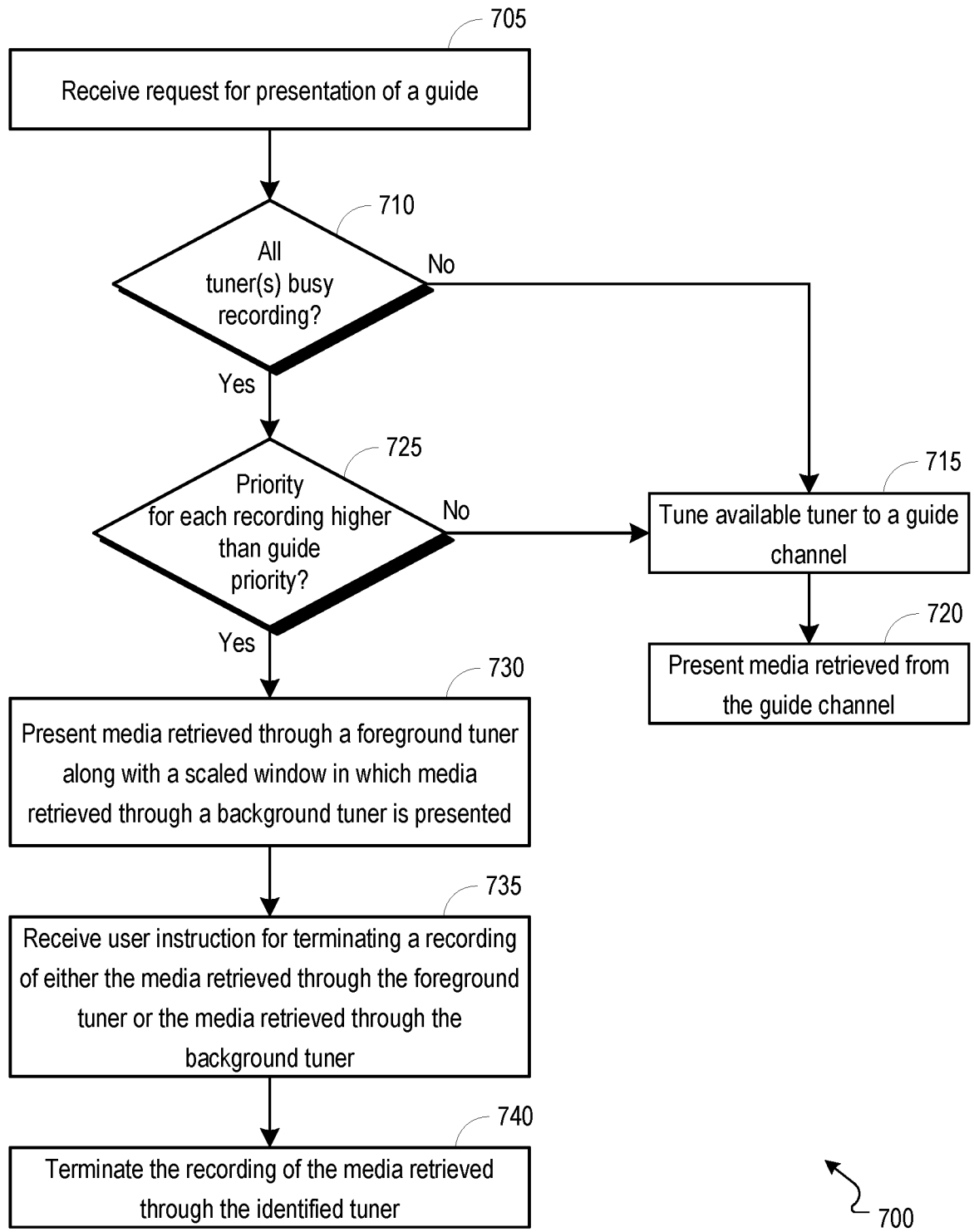
FIG. 7 is a flowchart illustrating an example process operable to facilitate the termination of a recording being carried out by either a foreground tuner or a background tuner in response to a presentation of media retrieved through the foreground tuner and media retrieved through the background tuner.

FIG. 7 is a flowchart illustrating an example process 700 operable to facilitate the termination of a recording being carried out by either a foreground tuner or a background tuner in response to a presentation of media retrieved through the foreground tuner and media retrieved through the background tuner. The process 700 may be carried out, for example, by a multimedia device 105 of FIG. 1. The process 700 can begin at 705, when a request for presentation of a guide is received. In embodiments, the request for presentation of a guide may be received at a multimedia device 105 and may be recognized by a guide module 215 of FIG. 2.

At 710, a determination may be made whether all tuners available to the multimedia device 105 are currently busy carrying out a recording operation. The determination whether all tuners (e.g., foreground and background tuners) are busy recording may be made, for example, by a guide module 215. In embodiments, the guide module 215 may determine a current tuning status (i.e., whether a tuner is tuned to a channel) and a current recording status (i.e., whether media received over a channel to which a tuner is tuned is being recorded) for each tuner (e.g., tuner 205 of FIG. 2) available to the multimedia device 105. If the determination is made that at least one tuner is not currently being utilized to record media retrieved over a channel, an available tuner (e.g., either a foreground or background tuner that is not carrying out a recording operation) may be tuned to a guide channel at 715, and media retrieved over the guide channel may be presented (e.g., the media may be output to a display such as a client device 110 of FIG. 1) at 720. For example, the guide module 215 may generate a display/interface that includes a primary display that includes a display of media retrieved over the guide channel, and the display/interface may include one or more secondary displays that include a display of media retrieved through one or more other tuners.

If, at 710, the determination is made that each of one or more tuners available to the multimedia device 105 is busy carrying out a recording operation, the process 700 may proceed to 725. At 725, a determination may be made whether a priority level associated with each of one or more recordings being carried out by the one or more tuners is higher than a priority level associated with the guide channel. The determination whether a priority level associated with each of the one or more recordings is higher than the priority level associated with the guide channel may be made, for example, by the guide module 215. In embodiments, the guide module 215 may compare a priority level associated with the guide channel to a priority level associated with each program being presented/recorded through each tuner. For example, a priority level associated with a guide channel and priority levels associated with individual recordings (e.g., priority based on preferred program, channel, genre, etc.) may be configured at the multimedia device 105 based upon default settings or based upon user-input. If the determination is made that at least one recording being carried out by a tuner has a lower priority level than the priority level associated with the guide channel, the recording associated with the lower priority level may be terminated and the tuner being utilized to carry out the recording may be tuned to a guide channel at 715. Media retrieved over the guide channel may be presented (e.g., the media may be output to a display such as a client device 110 of FIG. 1) at 720. For example, the guide module 215 may generate a display/interface that includes a primary display that includes a display of media retrieved over the guide channel, and the display/interface may include one or more secondary displays that include a display of media retrieved through one or more other tuners.

If, at 725, the determination is made that the priority level associated with each recording being carried out by the tuner(s) of the multimedia device 105 is higher than the priority level associated with the guide channel, the process 700 may proceed to 730. At 730, media retrieved through a foreground tuner may be presented along with a scaled window in which media retrieved through a background tuner is presented. For example, the guide module 215 may generate a display/interface that includes a primary display that includes a display of media retrieved through the foreground tuner (e.g., a tuner 205 of FIG. 2) along with one or more secondary displays that include a display of media retrieved through one or more background tuners (e.g., tuner(s) 205) that are currently being utilized for recording. The secondary display(s) may be presented within a scaled window (e.g., PIP window), over the top of the display of the media retrieved through the foreground tuner.

At 735, a user instruction to terminate either a recording of the media retrieved through the foreground tuner or a recording of the media retrieved through the background tuner may be received. The user instruction may be received, for example, by the guide module 215. In embodiments, the guide module 215 may present a selectable option to terminate either the recording of the media displayed within the primary display or the recording of the media displayed within the secondary display, wherein the option to terminate is presented within the displayed interface that includes the primary and secondary displays. In response to receiving a user selection of the option to terminate a recording, wherein the user selection includes an identification of the recording to be terminated (i.e., either the recording of the media displayed within the primary display or the recording of the media displayed within the secondary display), the guide module 215 may terminate the identified recording being carried out through the corresponding tuner at 740. In embodiments, the corresponding tuner may be tuned to the guide channel, and guide media received through the guide channel may be presented within the primary display while media retrieved over the tuner that was not identified for termination at 735 may be presented within the secondary display.

Figure 8:
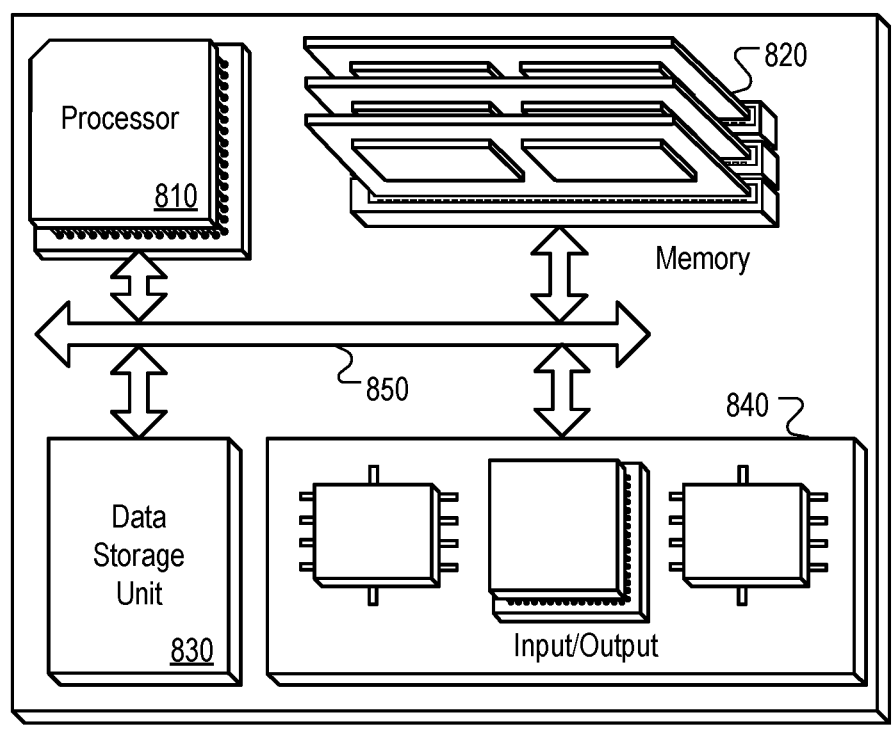
FIG. 8 is a block diagram of a hardware configuration operable to facilitate tuner conflict management in response to a request for guide media.

FIG. 8 is a block diagram of a hardware configuration 800 operable to facilitate tuner conflict management in response to a request for guide media. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 120 of FIG. 1, WAN 115 of FIG. 1, local network 125 of FIG. 1, etc.) or servers (e.g., guide server 130 of FIG. 1).

Those skilled in the art will appreciate that the invention improves upon methods and systems for managing tuner conflicts created by requests for guide media. Methods, systems, and computer readable media can be operable to facilitate tuner conflict management in response to a request for guide media. When a request for presentation of a guide is received at a multimedia device, the multimedia device may determine the status of a foreground tuner and one or more background tuners available to the multimedia device. If all background tuners are busy recording, the multimedia device may tune a foreground tuner to the guide channel and present the guide media to a user. If the foreground tuner and all background tuners are busy recording, the multimedia device may generate and output for presentation, a display that includes media from the foreground tuner and media from one or more background tuners. The multimedia device may provide a user with an option to terminate a current recording to free up a tuner for tuning to the guide channel.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving a request for a presentation of guide media, wherein the request for the presentation of guide media is received at a multimedia device;
   determining a current recording status of a foreground tuner associated with the multimedia device and one or more background tuners associated with the multimedia device; and
   if each respective one background tuner of the one or more background tuners associated with the multimedia device are currently recording a piece of content that is received over a channel to which the respective background tuner is tuned, determining a priority level associated with each piece of content being recorded by the one or more background tuners, comparing the priority level associated with each piece of content to a priority level associated with a guide channel, and if the priority level associated with each piece of content is higher than the priority level associated with the guide channel:
   tuning the foreground tuner away from a current channel to which the foreground tuner is tuned;
   tuning the foreground tuner to the guide channel, wherein the guide channel carries the guide media;
   retrieving the guide media from a transport stream that is received by the multimedia device over the guide channel;
   generating a first user interface that includes a primary display, wherein the primary display comprises a presentation of the guide media that is received through the foreground tuner, and wherein the first user interface does not include a presentation of content received over a channel to which a background tuner is tuned; and
   outputting the first user interface to a display.

2. The method of claim 1, further comprising:
   if each respective one background tuner of the one or more background tuners associated with the multimedia device are currently recording a piece of content that is received over a channel to which the respective background tuner is tuned:
   tuning the foreground tuner to a guide channel, wherein the guide channel carries the guide media;
   generating a second user interface that includes a primary display and a secondary display, wherein the primary display comprises a presentation of the guide media that is received through the foreground tuner, and wherein the secondary display comprises a presentation of content received over a channel to which a background tuner is tuned; and
   outputting the second user interface to a display.

3. The method of claim 2, further comprising:
   wherein the second user interface comprises a selectable option to terminate the recording of the content received over the channel to which the background tuner is tuned;
   receiving a user selection of the option to terminate the recording of the content received over the channel to which the background tuner is tuned; and
   terminating the recording of the content received over the channel to which the background tuner is tuned.

4. The method of claim 3, further comprising:
   tuning the background tuner to the guide channel;
   tuning the foreground tuner to a channel to which the foreground tuner was tuned to before being tuned to the guide channel;
   presenting the guide media that is received through the background tuner within the primary display; and
   presenting content received over the channel to which the foreground tuner was tuned to before being tuned to the guide channel within the secondary display.

5. The method of claim 1, further comprising:
   if the foreground tuner associated with the multimedia device is currently recording a piece of content that is received over a channel to which the foreground tuner is tuned and each respective one background tuner of the one or more background tuners associated with the multimedia device are currently recording a piece of content that is received over a channel to which the respective background tuner is tuned:
   generating a second user interface that includes a primary display and a secondary display, wherein the primary display comprises a presentation of content received over a channel to which the foreground tuner is tuned, and wherein the secondary display comprises a presentation of content received over a channel to which a background tuner is tuned; and
   outputting the second user interface to a display.

6. The method of claim 5, further comprising:
   wherein the second user interface comprises a selectable option to terminate the recording of the content received over the channel to which the background tuner is tuned or the recording of the content received over the channel to which the foreground tuner is tuned;

receiving a user selection of the option to terminate the recording of the content received over the channel to which the background tuner is tuned or the channel to which the foreground tuner is tuned, wherein the user selection comprises an identification of the tuner receiving a channel carrying content, the recording of which is to be terminated; and terminating the recording of the content received over the channel to which the tuner identified within the user selection is tuned.

7. The method of claim 6, further comprising:

tuning the tuner identified within the user selection to the guide channel; and presenting the guide media that is received over the guide channel within the primary display of the second user interface.

8. A multimedia device comprising:

an interface that receives a request for a presentation of guide media;

a guide module that:

determines a current recording status of a foreground tuner associated with the multimedia device and one or more background tuners associated with the multimedia device; and if each respective one background tuner of the one or more background tuners are currently recording a piece of content that is received over a channel to which the respective background tuner is tuned, determines a priority level associated with each piece of content being recorded by the one or more background tuners, compares the priority level associated with each piece of content to a priority level associated with a guide channel, and if the priority level associated with each piece of content is higher than the priority level associated with the guide channel:

tunes the foreground tuner away from a current channel to which the foreground tuner is tuned;

tunes the foreground tuner to the guide channel, wherein the guide channel carries the guide media;

retrieving the guide media from a transport stream that is received by the multimedia device over the guide channel;

generates a first user interface that includes a primary display, wherein the primary display comprises a presentation of the guide media that is received through the foreground tuner, and wherein the first user interface does not include a presentation of content received over a channel to which a background tuner is tuned; and outputs the first user interface to a display.

9. The multimedia device of claim 8, wherein if each respective one background tuner of the one or more background tuners are currently recording a piece of content that is received over a channel to which the respective background tuner is tuned, the guide module:

tunes the foreground tuner to a guide channel, wherein the guide channel carries the guide media;

generates a second user interface that includes a primary display and a secondary display, wherein the primary display comprises a presentation of the guide media that is received through the foreground tuner, and wherein the secondary display comprises a presentation of content received over a channel to which a background tuner is tuned; and outputs the second user interface to a display.

10. The multimedia device of claim 9, wherein the second user interface comprises a selectable option to terminate the recording of the content received over the channel to which the background tuner is tuned, and wherein the guide module further:

receives a user selection of the option to terminate the recording of the content received over the channel to which the background tuner is tuned; and terminates the recording of the content received over the channel to which the background tuner is tuned.

11. The multimedia device of claim 8, wherein if the foreground tuner is currently recording a piece of content that is received over a channel to which the foreground tuner is tuned and each respective one background tuner of the one or more background tuners are currently recording a piece of content that is received over a channel to which the respective background tuner is tuned, the guide module further:

generates a second user interface that includes a primary display and a secondary display, wherein the primary display comprises a presentation of content received over a channel to which the foreground tuner is tuned, and wherein the secondary display comprises a presentation of content received over a channel to which a background tuner is tuned; and outputs the second user interface to a display.

12. The multimedia device of claim 11, wherein the second user interface comprises a selectable option to terminate the recording of the content received over the channel to which the background tuner is tuned or the recording of the content received over the channel to which the foreground tuner is tuned, and wherein the guide module further:

receives a user selection of the option to terminate the recording of the content received over the channel to which the background tuner is tuned or the channel to which the foreground tuner is tuned, wherein the user selection comprises an identification of the tuner receiving a channel carrying content, the recording of which is to be terminated; and terminates the recording of the content received over the channel to which the tuner identified within the user selection is tuned.

13. The multimedia device of claim 12, wherein the guide module further:

tunes the tuner identified within the user selection to the guide channel; and presents the guide media that is received over the guide channel within the primary display of the second user interface.

14. One or more non-transitory computer readable media having instructions operable to cause one or more processors to perform the operations comprising:

receiving a request for a presentation of guide media, wherein the request for the presentation of guide media is received at a multimedia device;

determining a current recording status of a foreground tuner associated with the multimedia device and one or more background tuners associated with the multimedia device; and if each respective one background tuner of the one or more background tuners associated with the multimedia device are currently recording a piece of content that is received over a channel to which the respective background tuner is tuned, determining a priority level associated with each piece of content being recorded by the one or more background tuners, comparing the priority level associated with each piece of content to a priority level associated with a guide channel, and if the priority level associated with each piece of content is higher than the priority level associated with the guide channel:
  tuning the foreground tuner away from a current channel to which the foreground tuner is tuned;
  tuning the foreground tuner to the guide channel, wherein the guide channel carries the guide media;
  retrieving the guide media from a transport stream that is received by the multimedia device over the guide channel;
  generating a first user interface that includes a primary display, wherein the primary display comprises a presentation of the guide media that is received through the foreground tuner, and wherein the first user interface does not include a presentation of content received over a channel to which a background tuner is tuned; and
  outputting the first user interface to a display.

15. The one or more non-transitory computer-readable media of claim 14, wherein the instructions are further operable to cause one or more processors to perform the operations comprising:
  if each respective one background tuner of the one or more background tuners associated with the multimedia device are currently recording a piece of content that is received over a channel to which the respective background tuner is tuned:
  tuning the foreground tuner to a guide channel, wherein the guide channel carries the guide media;
  generating a second user interface that includes a primary display and a secondary display, wherein the primary display comprises a presentation of the guide media that is received through the foreground tuner, and wherein the secondary display comprises a presentation of content received over a channel to which a background tuner is tuned; and
  outputting the second user interface to a display.

16. The one or more non-transitory computer-readable media of claim 15, wherein the instructions are further operable to cause one or more processors to perform the operations comprising:
  wherein the second user interface comprises a selectable option to terminate the recording of the content received over the channel to which the background tuner is tuned;
  receiving a user selection of the option to terminate the recording of the content received over the channel to which the background tuner is tuned; and
  terminating the recording of the content received over the channel to which the background tuner is tuned.

17. The one or more non-transitory computer-readable media of claim 16, wherein the instructions are further operable to cause one or more processors to perform the operations comprising:
  tuning the background tuner to the guide channel;
  tuning the foreground tuner to a channel to which the foreground tuner was tuned to before being tuned to the guide channel;
  presenting the guide media that is received through the background tuner within the primary display; and
  presenting content received over the channel to which the foreground tuner was tuned to before being tuned to the guide channel within the secondary display.

18. The one or more non-transitory computer-readable media of claim 14, wherein the instructions are further operable to cause one or more processors to perform the operations comprising:
  if the foreground tuner associated with the multimedia device is currently recording a piece of content that is received over a channel to which the foreground tuner is tuned and each respective one background tuner of the one or more background tuners associated with the multimedia device are currently recording a piece of content that is received over a channel to which the respective background tuner is tuned:
  generating a second user interface that includes a primary display and a secondary display, wherein the primary display comprises a presentation of content received over a channel to which the foreground tuner is tuned, and wherein the secondary display comprises a presentation of content received over a channel to which a background tuner is tuned; and
  outputting the second user interface to a display.

19. The one or more non-transitory computer-readable media of claim 18, wherein the instructions are further operable to cause one or more processors to perform the operations comprising:
  wherein the second user interface comprises a selectable option to terminate the recording of the content received over the channel to which the background tuner is tuned or the recording of the content received over the channel to which the foreground tuner is tuned;
  receiving a user selection of the option to terminate the recording of the content received over the channel to which the background tuner is tuned or the channel to which the foreground tuner is tuned, wherein the user selection comprises an identification of the tuner receiving a channel carrying content, the recording of which is to be terminated; and
  terminating the recording of the content received over the channel to which the tuner identified within the user selection is tuned.

20. The one or more non-transitory computer-readable media of claim 19, wherein the instructions are further operable to cause one or more processors to perform the operations comprising:
  tuning the tuner identified within the user selection to the guide channel; and
  presenting the guide media that is received over the guide channel within the primary display of the second user interface.

* * * * *